United States Patent
Hattori et al.

(10) Patent No.: US 7,164,548 B2
(45) Date of Patent: Jan. 16, 2007

(54) MAGNETIC RECORDING MEDIUM AND METHOD OF MANUFACTURING MAGNETIC RECORDING MEDIUM

(75) Inventors: Kazuhiro Hattori, Chuo-ku (JP); Kuniyasu Ito, Chuo-ku (JP)

(73) Assignee: TDK Corporation, Tokyo (JP)

( * ) Notice: Subject to any disclaimer, the term of this patent is extended or adjusted under 35 U.S.C. 154(b) by 141 days.

(21) Appl. No.: 10/805,357

(22) Filed: Mar. 22, 2004

(65) Prior Publication Data

US 2004/0190180 A1 Sep. 30, 2004

(30) Foreign Application Priority Data

Mar. 26, 2003 (JP) .............................. 2003-086021

(51) Int. Cl.
*G11B 5/09* (2006.01)
(52) U.S. Cl. ......................................................... 360/48
(58) Field of Classification Search ...................... None
See application file for complete search history.

(56) References Cited

U.S. PATENT DOCUMENTS

| | | | | |
|---|---|---|---|---|
| 5,231,550 | A * | 7/1993 | Hashimoto | ............... 360/78.06 |
| 5,381,287 | A | 1/1995 | Kawazoe et al. | |
| 6,262,859 | B1 * | 7/2001 | Cho | ........................ 360/77.08 |
| 6,421,195 | B1 | 7/2002 | Rubin et al. | |
| 6,466,387 | B1 * | 10/2002 | Ogasawara et al. | ............ 360/48 |
| 6,529,341 | B1 | 3/2003 | Ishida et al. | |
| 6,590,729 | B1 | 7/2003 | Akagi et al. | |
| 6,738,205 | B1 * | 5/2004 | Moran et al. | .................. 360/17 |
| 6,816,330 | B1 * | 11/2004 | Ikeda et al. | .................... 360/59 |
| 6,852,431 | B1 * | 2/2005 | Fukutani et al. | ............ 428/826 |
| 7,068,462 | B1 * | 6/2006 | Nishida et al. | ........... 360/78.04 |

FOREIGN PATENT DOCUMENTS

| | | |
|---|---|---|
| JP | A 6-195907 | 7/1994 |
| JP | 07-065363 | 3/1995 |
| JP | 09-007158 | 1/1997 |
| JP | 2000-306227 | 11/2000 |
| JP | 2001-110027 | 4/2001 |
| JP | 2003-016621 | 1/2003 |

OTHER PUBLICATIONS

European Search Report for Application No. EP 04 00 6967 completed Oct. 25, 2005.

* cited by examiner

*Primary Examiner*—Wayne Young
*Assistant Examiner*—Glenda P. Rodriguez
(74) *Attorney, Agent, or Firm*—Oliff & Berridge, PLC

(57) ABSTRACT

A magnetic recording medium and a method of manufacturing the same which serve for stable head behavior and efficient recording of servo information. In each servo area, a magnetic layer is separated into a plurality of servo pattern unit parts for forming a predetermined servo pattern and a plurality of servo pattern gap filling parts patterned to fill gaps between the plurality of servo pattern unit parts partly. The servo pattern unit parts and the servo pattern gap filling parts are formed in different sizes so as to have different magnetic properties.

15 Claims, 10 Drawing Sheets

MAGNETIC RECORDING MEDIUM AND METHOD OF MANUFACTURING MAGNETIC RECORDING MEDIUM

BACKGROUND OF THE INVENTION

1. Field of the Invention

The present invention relates to a magnetic recording medium and a method of manufacturing a magnetic recording medium.

2. Description of the Related Art

Conventionally, magnetic recording media such as a hard disc have magnetic layer which is sectioned into a plurality of data areas and a plurality of servo areas for information recording. Servo information intended for control such as head positioning is magnetically recorded on the servo areas in a predetermined servo pattern.

The process of recording the servo information has a problem of low productivity since servo pattern parts of the servo areas and the peripheral parts thereof are magnetized in opposite polarities one by one for every magnetic recording medium by a servo track writing method. In particular, with a recent improvement in surface recording density and an accompanying decrease in head flying height, high-density high-precision recording has also been required of the servo information. This means an increasing need for an improvement to the recording efficiency of the servo information.

In view of this, there have been proposed magnetic recording media in which the magnetic layer is formed only in either ones of the servo pattern parts and the peripheral parts so that a servo pattern is formed physically (for example, see Japanese Patent Laid-Open Publication No. H 6-195907). In this case, a direct-current magnetic field can be uniformly applied to the magnetic recording medium to magnetize the magnetic layer to the servo pattern, with a significant improvement in the recording efficiency of the servo information.

Recently, much attention has been given to magnetic recording media of discrete type in which the magnetic layer in the data areas is separated into a number of recording elements for the sake of a significant increase in surface recording density. Such a magnetic recording medium of discrete type is advantageous in that the magnetic layer can be separated and processed in the data areas simultaneously with in the servo areas.

Nevertheless, if servo patterns are made of recesses and projections, the airflow between the magnetic recording medium and the head is disturbed to make the flying height and orientation of the head unstable, causing the problem of a drop in information recording/read accuracy.

In particular, many servo patterns have certain regularities, which can often contribute to unstable airflow between the magnetic recording medium and the head. Servo patterns are determined depending on disc drives on the head side, and it is therefore impossible to adopt arbitrary servo patterns for stabilizing the airflow between the magnetic recording medium and the head.

In addition, the pattern of the recesses and projections at the surface vary largely across the boundaries between the servo areas and the data areas. Consequently, the head flying height and the head orientation tend to be unstable across the boundaries between the servo areas and the data areas in particular.

SUMMARY OF THE INVENTION

In view of the foregoing problems, various exemplary embodiments of this invention provide a magnetic recording medium which serves for stable head behavior and efficient recording of servo information. Furthermore, various exemplary embodiments of the invention provide a method of manufacturing such a magnetic recording medium.

Various exemplary embodiments of the invention solved the foregoing problems by separating each servo area of a magnetic layer into servo pattern unit parts and servo pattern gap filling parts/part which are/is patterned to fill gaps between the servo pattern unit parts partly. Here, the servo pattern gap filling parts/part are/is patterned as appropriate so that favorable airflow is formed between the magnetic recording medium and a head.

In the process of achieving the present invention, the inventors have tried to process magnetic layers into various shapes, and noticed that the magnetic layers vary in magnetic properties with their physical sizes. One example of the findings is that magnetic layers tend to show significant increases in coercivity at sizes below approximately several hundreds of nanometers.

Thus, when the servo pattern unit parts and the servo pattern gap filling parts/part are formed in different sizes so as to have different magnetic properties, they can be distinguished based on the differences in magnetic properties.

Note that the servo pattern gap filling parts/part are/is formed as part of the magnetic layer 12, and thus are easy to fabricate as compared to the case where the servo pattern gap filling parts/part are/is made of other materials. This is advantageous in terms of productivity.

Accordingly, various exemplary embodiments of the invention provide a magnetic recording medium comprising a magnetic layer which is sectioned into a plurality of data areas and a plurality of servo areas for information recording, wherein in each of the servo areas, the magnetic layer is separated into a plurality of servo pattern unit parts for forming a predetermined servo pattern and a plurality of servo pattern gap filling parts patterned to fill gaps between the plurality of servo pattern unit parts partly, the servo pattern unit parts and the servo pattern gap filling parts being formed in a pattern of projections of the magnetic layer and recesses therebetween.

A magnetic recording medium comprising a magnetic layer which is sectioned into a plurality of data areas and a plurality of servo areas for information recording, wherein in each of the servo areas of the magnetic layer, servo pattern unit parts for forming a predetermined servo pattern are separated in a direction vertical to the traveling direction of a write/read head so as to have a length greater than or equal to a track width, but not exceeding 0.2 mm, in the direction vertical to the traveling direction of the write/read head.

A method of manufacturing a magnetic recording medium, comprising:

a magnetic layer forming step of forming a uniform magnetic layer on a substrate; and a magnetic layer processing step of separating the magnetic layer into a plurality of servo pattern unit parts consisting of projections for forming a predetermined servo pattern and a plurality of servo pattern gap filling parts consisting of projections for filling gaps between the plurality of servo pattern unit parts partly, and forming the servo pattern unit parts and the servo pattern gap filling parts in different sizes so as to have different coercivities;

a first direct-current magnetic field applying step of applying a uniform direct-current magnetic field higher than the coercivities of both the servo pattern unit parts and the servo pattern gap filling parts to the magnetic layer; and a second direct-current magnetic field applying step of applying a uniform direct-current magnetic field having an intensity intermediate between the coercivity of the servo pattern unit parts and the coercivity of the servo pattern gap filling parts to the magnetic layer in a direction opposite to that of the foregoing direct-current magnetic field.

DESCRIPTION OF THE PREFERRED EMBODIMENT

Hereinafter, a preferable exemplary embodiment of the invention will be described in detail with reference to the drawings.

Figure 1:
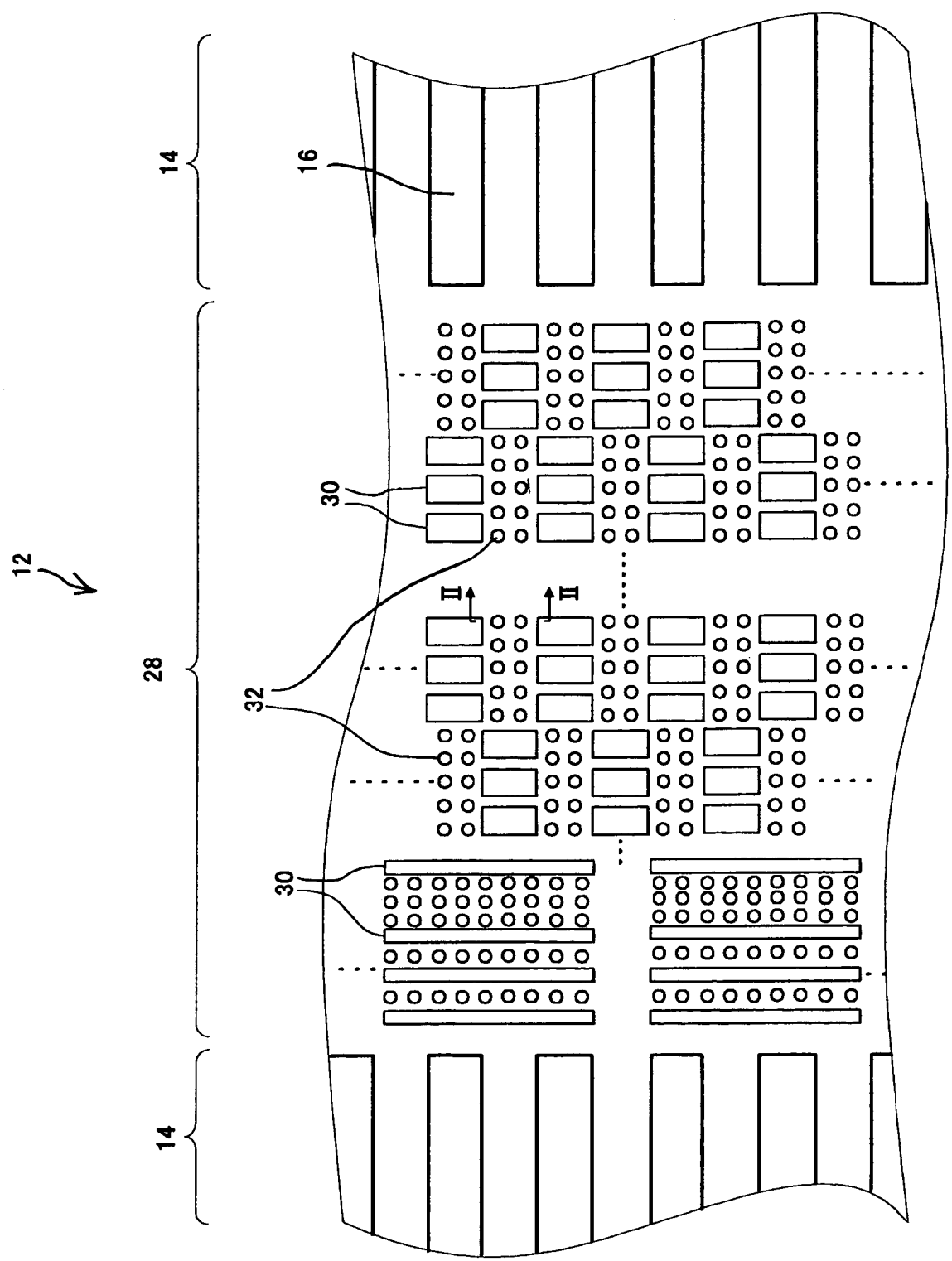
FIG. 1 is a plan view schematically showing the structure of a magnetic recording medium according to an exemplary embodiment of the present invention.
Figure 2:
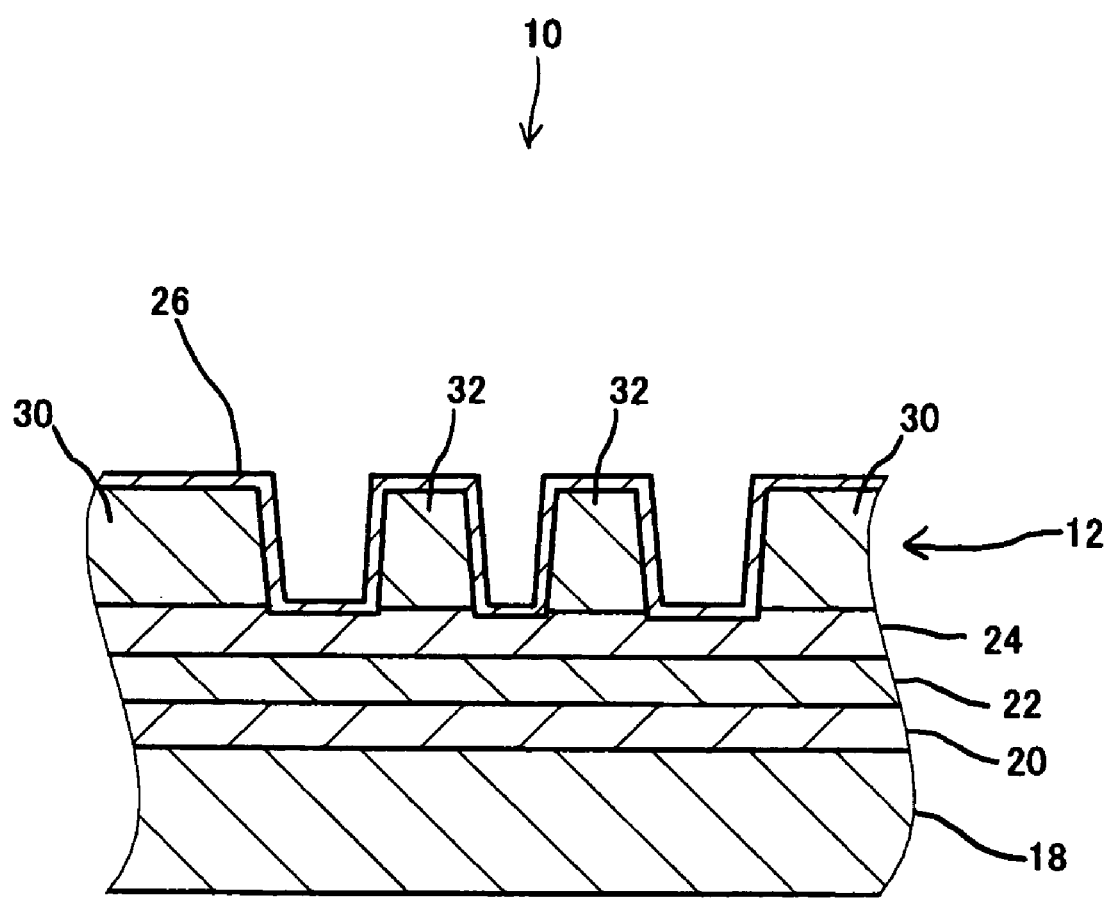
FIG. 2 is a sectional side view taken along the line II—II of FIG. 1.

FIG. 1 is a plan view schematically showing the structure of a magnetic recording medium according to the exemplary embodiment. FIG. 2 is a sectional side view taken along the line II—II of FIG. 1.

A magnetic recording medium 10 is a vertical recording magnetic disc of discrete type, having a magnetic layer 12 which is sectioned into a plurality of data areas 14 and a plurality of servo areas 28 for information recording. In the data areas 14, the magnetic layer 12 is physically separated into a number of recording elements 16 at fine track pitches in the radial direction. An underlayer 20, a soft magnetic layer 22, a seed layer 24, the magnetic layer 12, and a protective layer 26 are formed on a substrate 18 in this order.

The magnetic recording medium 10 is characterized in that in each of the servo areas 28, the magnetic layer 12 is separated into a plurality of servo pattern unit parts 30 which form a predetermined servo pattern and servo pattern gap filling parts 32 which are patterned to fill the gaps between the plurality of servo pattern unit parts 30 partly, and that the servo pattern unit parts 30 and the servo pattern gap filling parts 32 are formed in different sizes so as to have different magnetic properties.

The rest of the configuration is the same as that of conventional magnetic recording media. Description thereof will thus be omitted as appropriate.

Figure 3:
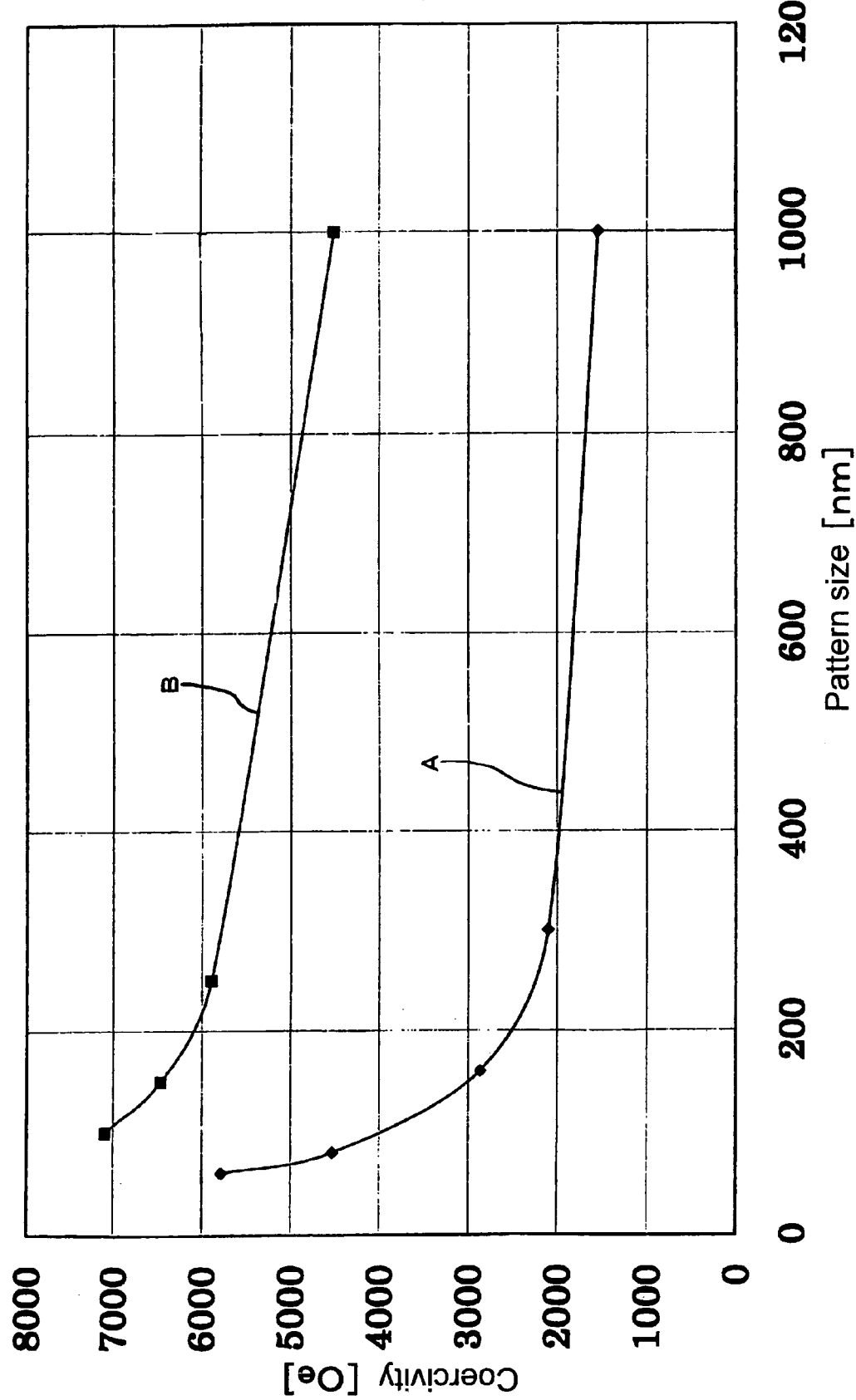
FIG. 3 is a graph showing the relationship between the physical size and coercivity of the magnetic layer of the magnetic recording medium.

The constituents of the magnetic layer 12, i.e., the recording elements 16, the servo pattern unit parts 30, and the servo pattern gap filling parts 32 are made of a CoPt (cobalt-platinum) alloy. As shown by the curve designated by the symbol A in FIG. 3, the CoPt alloy has the property of increasing in coercivity with decreasing size, and increasing in coercivity significantly at sizes of 200 nm or below in particular.

The recording elements 16 are arranged in a number of rows concentrically with the data areas 14.

The servo pattern unit parts 30 are formed for respective servo pattern units constituting the servo pattern, and are formed to the same shapes as those of the respective servo pattern units.

The servo pattern gap filling parts 32 are generally-circular protrusions formed smaller than the servo pattern unit parts 30, having coercivity higher than that of the servo pattern unit parts 30. A number of servo pattern gap filling parts 32 are formed between the individual servo pattern unit parts 30. Many of the servo pattern gap filling parts 32 are patterned to lie near the data areas 14 within the servo areas 28.

The servo pattern unit parts 30 are separated in the radial directions of the magnetic disc (in directions vertical to the traveling direction of a recording head). At the time of separation, the servo pattern unit parts 30 are preferably formed to have a width equal to or greater than the recording track width (the width of the recording elements 16) of the discrete type magnetic disc. If the servo pattern unit parts 30 are narrower than the recording track width, it is difficult to read servo signals with the magnetic head. The width of separation of the servo pattern unit parts 30 is thus determined by the recording track width of the magnetic disc. It is also preferable that the servo pattern unit parts 30 be formed to have a width of 0.2 mm or below. If the servo pattern unit parts 30 exceed 0.2 mm in width, the airflow between the rotating magnetic disc and the magnetic head can cause unfavorable turbulence.

The servo pattern unit parts 30 and the servo pattern gap filling parts 32 are magnetized in opposite polarities.

The substrate 18 is made of glass. The underlayer 20 is made of Cr (chromium) or a Cr alloy. The soft magnetic layer 22 is made of an Fe (iron) alloy or a Co (cobalt) alloy. The seed layer 24 is made of CoO, MgO, NiO, or the like. The protective layer 26 is made of DLC (Diamond Like Carbon).

As employed herein, the term DLC refers to a material that consists chiefly of carbon, has an amorphous structure, and exhibits a hardness of the order of 200 to 8000 kgf/mm$^2$ in Vickers hardness tests.

Now, description will be given of the operation of the magnetic recording medium 10.

In the magnetic recording medium 10, the servo pattern gap filling parts 32 are patterned to fill the gaps between the plurality of servo pattern unit parts 30 partly. The surface is thus made flatter than in a magnetic recording medium that is provided with the servo pattern unit parts 30 alone. This reduces the turbulence of the airflow between the magnetic recording medium 10 and the head, serving for stable head behavior.

Besides, the servo pattern gap filling parts 32 are patterned so that the ratio of the total area of the servo pattern unit parts 30 and the servo pattern gap filling parts 32 in each servo area 28 approaches the ratio of the area of the recording elements 16 in the data areas 14. The head behavior is thus stabilized even across the boundaries between the data areas 14 and the servo areas 28.

In particular, many of the servo pattern gap filling parts 32 are patterned to lie near the servo areas 28. This enhances the effect of stabilizing head behavior across the boundaries between the data areas 14 and the servo areas 28.

In addition, the servo pattern unit parts 30 are separated in the directions vertical to the traveling direction of the write/read head, and the airflow along the traveling direction of the write/read head can pass through between the separated portions. Thus, the turbulence of airflow by the servo pattern unit parts 30 is reduced accordingly. Even in this respect, the effect of stabilizing head behavior is enhanced further.

The servo pattern gap filling parts 32 are formed smaller than the servo pattern unit parts 30, and are high in patterning flexibility. The airflow can thus be adjusted accordingly finer.

Since the servo pattern unit parts 30 and the servo pattern gap filling parts 32 both are part of the common magnetic layer 12, it is possible to match the surface height of the servo pattern unit parts 30 and the surface height of the servo pattern gap filling parts 32 with high precision. Even in this respect, the effect of stabilizing head behavior can be obtained.

Besides, the servo pattern unit parts 30 are formed to the same shapes as those of the respective servo pattern units for forming the servo pattern. It is therefore possible to enhance the read accuracy of the servo information.

Moreover, since the servo pattern unit parts 30 and the servo pattern gap filling parts 32 have different coercivities, the magnetic recording medium 10 can be easily magnetized with the servo pattern unit parts 30 and the servo pattern gap filling parts 32 in different polarities as will be described later, serving for efficient recording of the servo information.

Next, an exemplary embodiment of a method of manufacturing the magnetic recording medium 10 will be described.

Figure 4:
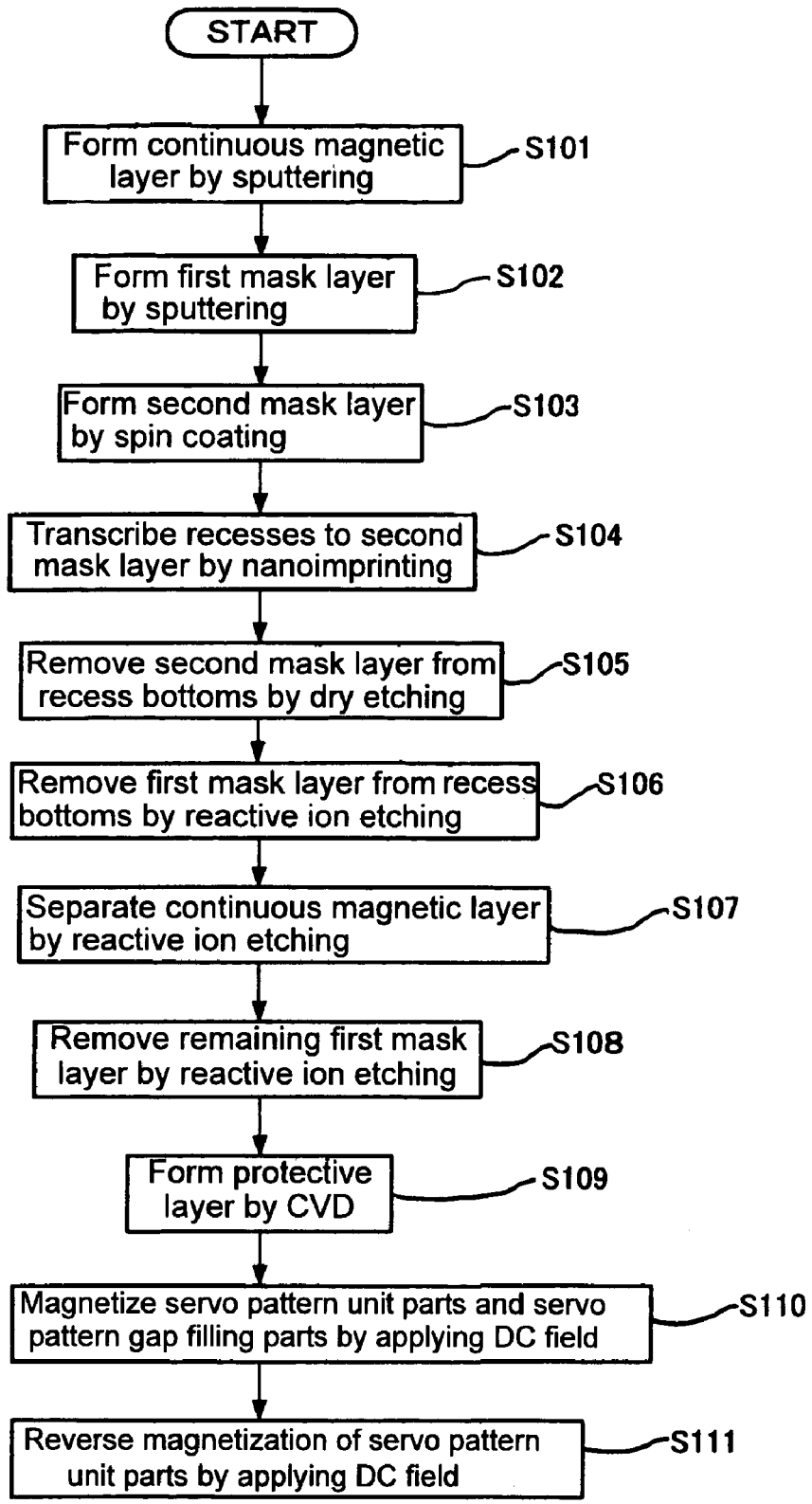
FIG. 4 is a flowchart showing the steps of manufacturing the magnetic recording medium.

FIG. 4 is a flowchart outlining manufacturing the magnetic recording medium 10.

Figure 5:
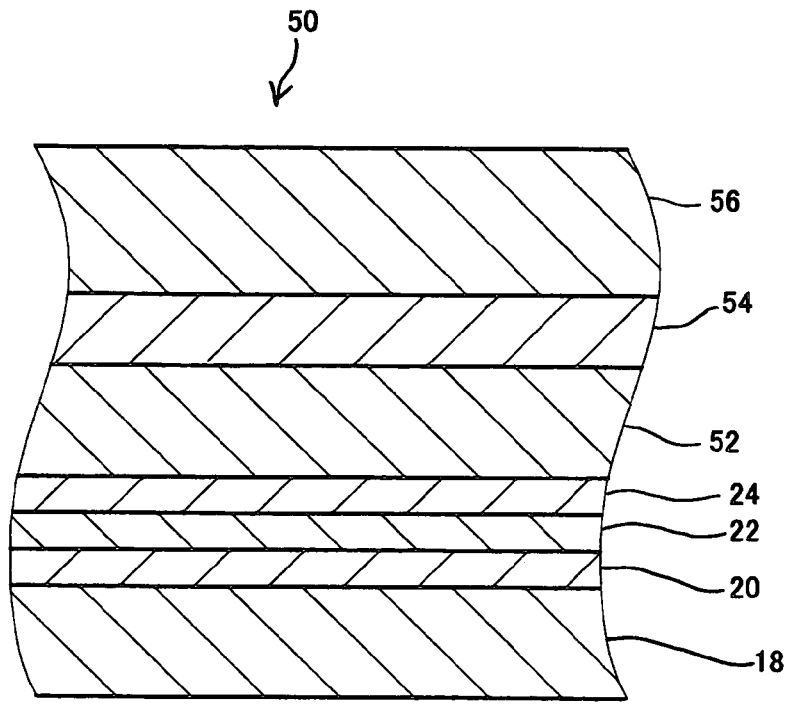
FIG. 5 is a sectional side view schematically showing the structure of a starting material in the process of manufacturing the magnetic recording medium.

Initially, a starting material 50 such as shown in FIG. 5 is prepared for the manufacturing process. This starting material 50 is formed by sputtering an underlayer 20 of 300 to 2000 Å in thickness, a soft magnetic layer 22 of 500 to 3000 Å in thickness, a seed layer 24 of 30 to 300 Å in thickness, and a continuous magnetic layer 52 of 100 to 300 Å in thickness on a substrate 18 in this order (S101). Moreover, a first mask layer 54 is sputtered to a thickness of 100 to 500 Å on the continuous magnetic layer 52 (S102). A second mask layer 56 of 300 to 3000 Å in thickness is then formed by spin coating or dipping (S103), followed by baking.

Incidentally, the first mask layer 54 is made of TiN (titanium nitride), and the second mask layer 56 is made of a negative type resist (NEB22A from Sumitomo Chemical Co., Ltd.).

Figure 6:
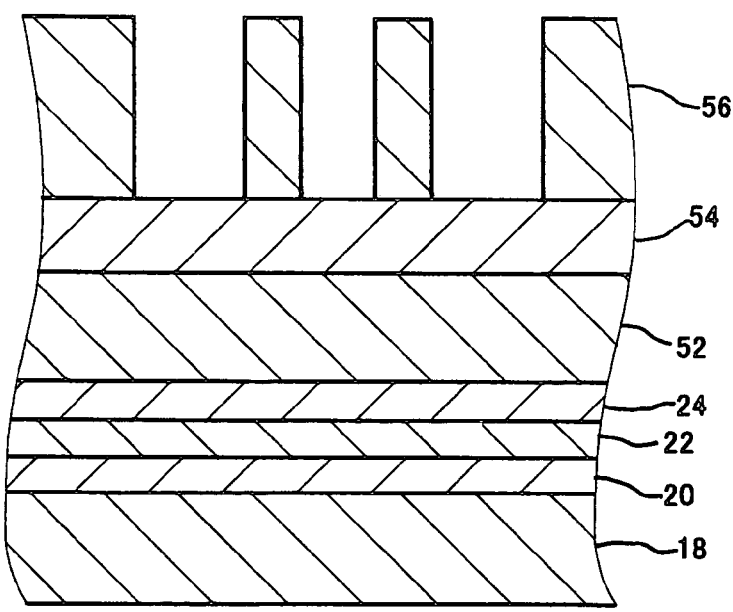
FIG. 6 is a sectional side view schematically showing the step of processing a second mask layer of the starting material.

Onto the second mask layer 56 of the starting material 50 obtained thus, recesses corresponding to the separation pattern of the recording elements 16 in the data areas 14 and the separation pattern of the servo pattern unit parts 30 and servo pattern gap filling parts 32 in the servo areas 28 are transcribed by nanoimprinting (S104) using transcribing means (not shown). Then, the entire surface of the second mask layer 56 is dry etched with an oxygen- or ozone-gas-based plasma uniformly, so that the second mask layer 56 is removed from the recess bottoms as shown in FIG. 6 (S105) to expose the first mask layer 54 at the recess bottoms. Note that the dry etching also removes the second mask layer 56 at regions other than the recesses, whereas the second mask layer 56 remains as much as the difference in level from the recess bottoms.

Figure 7:
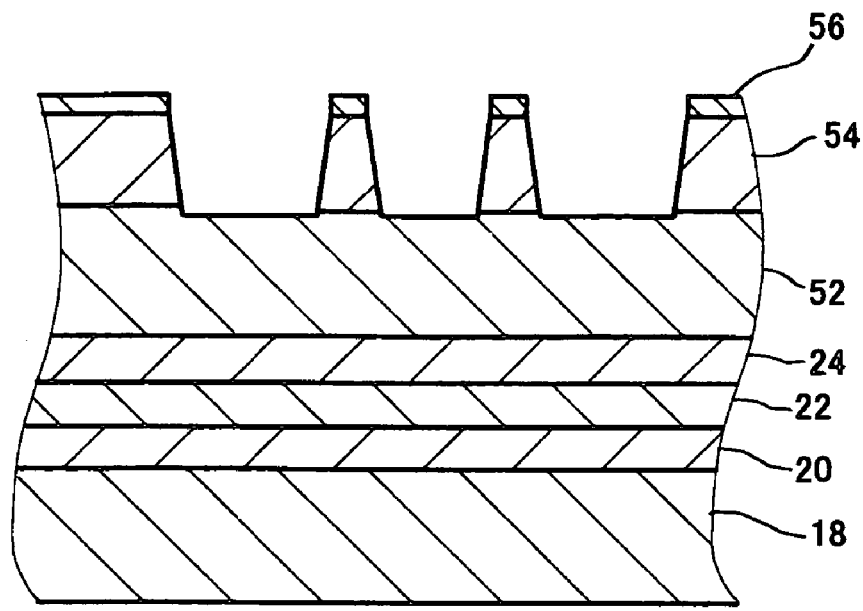
FIG. 7 is a sectional side view schematically showing the step of processing a first mask layer of the starting material.

Next, the first mask layer 54 is removed from the recess bottoms as shown in FIG. 7 (S106) by reactive ion etching using $CF_4$ (carbon tetrafluoride) gas or $SF_6$ (sulfur hexafluoride) gas as the reactive gas. Here, a small amount of the continuous magnetic layer 52 is also removed. Moreover, the second mask layer 56 is largely removed from the regions other than the recesses, but remains slightly.

Figure 8:
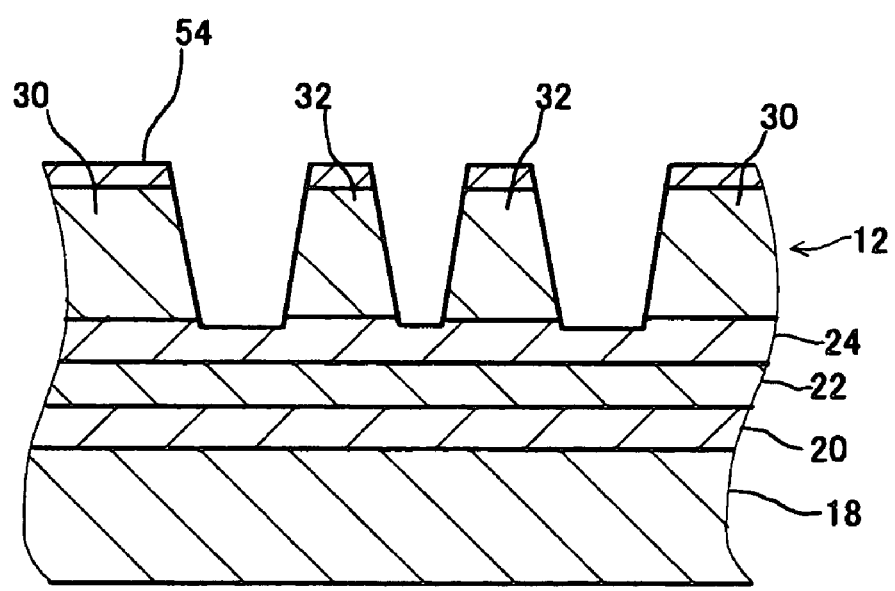
FIG. 8 is a sectional side view schematically showing the step of processing a magnetic layer of the starting material.

Next, the continuous magnetic layer 52 is removed from the recess bottoms as shown in FIG. 8 by reactive ion etching using a mixed gas of $NH_3$ (ammonia) gas and CO (carbon monoxide) gas as the reactive gas. This separates the continuous magnetic layer 52 into a number of fine recording elements 16 in the data areas 14, and into the servo pattern unit parts 30 and the servo pattern gap filling parts 32 in the servo areas 28 (S107). Here, a small amount of the seed layer 24 is also removed from the recess bottoms. While the second mask layer 56 is removed from the regions other than the recesses completely, the first mask layer 54 remains slightly on the recording elements 16, the servo pattern unit parts 30, and the servo pattern gap filling parts 32 in the regions other than the recesses.

Figure 9:
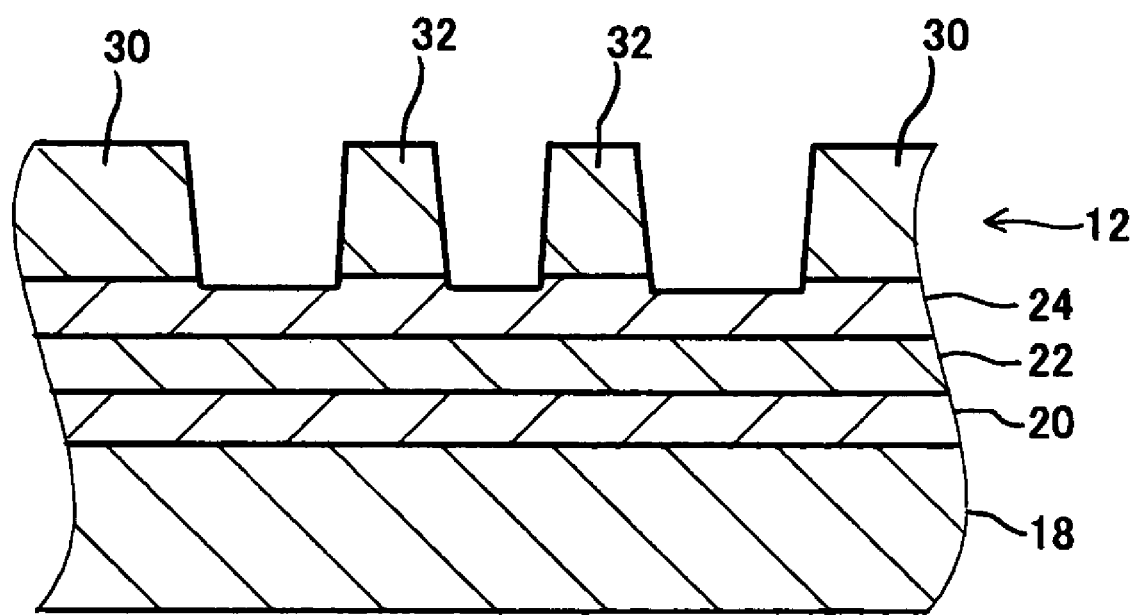
FIG. 9 is a sectional side view schematically showing the step of removing the first mask layer of the starting material.

This remaining first mask layer 54 is completely removed as shown in FIG. 9 (S108) by reactive ion etching using $CF_4$ gas or $SF_6$ gas as the reactive gas.

Moreover, a protective layer 26 is formed on the surface of the magnetic layer 12 and the recess bottoms by CVD (S109), thereby obtaining the magnetic recording medium 10 as shown in FIGS. 1 and 2 seen above.

Incidentally, if necessary, a lubrication layer of, e.g., PFPE (perfluoropolyether) is applied to a thickness of 10 to 20 Å on the surface of the protective layer 26 by dipping.

Now, description will be given of the method of recording servo information on the magnetic recording medium 10.

Figure 10:
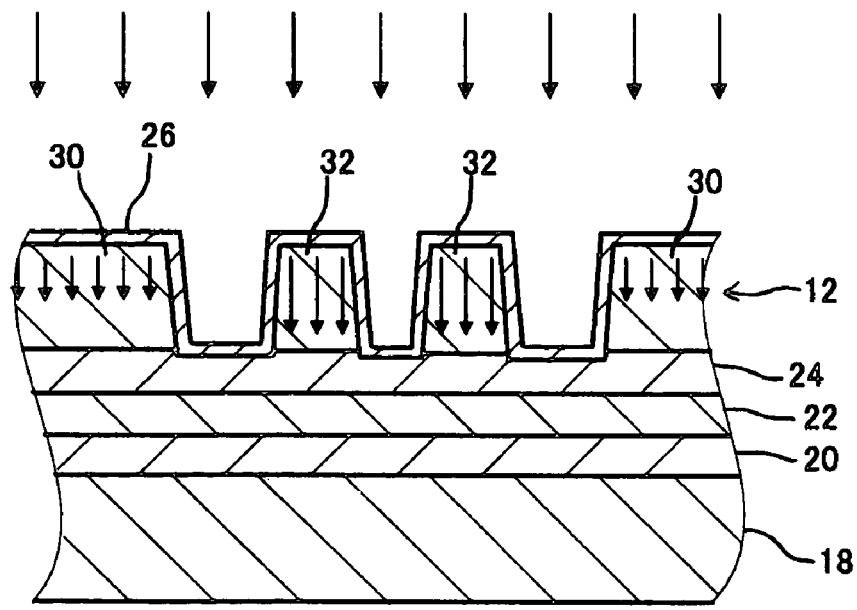
FIG. 10 is a sectional side view schematically showing the step of applying a first external magnetic field to the magnetic recording medium.

Initially, as schematically shown in FIG. 10, a uniform direct-current external magnetic field higher than the coercivities of both the servo pattern unit parts 30 and the servo pattern gap filling parts 32 is applied to the magnetic recording medium 10, so that the servo pattern unit parts 30 and the servo pattern gap filling parts 32 are magnetized in the same polarity (S110).

Figure 11:
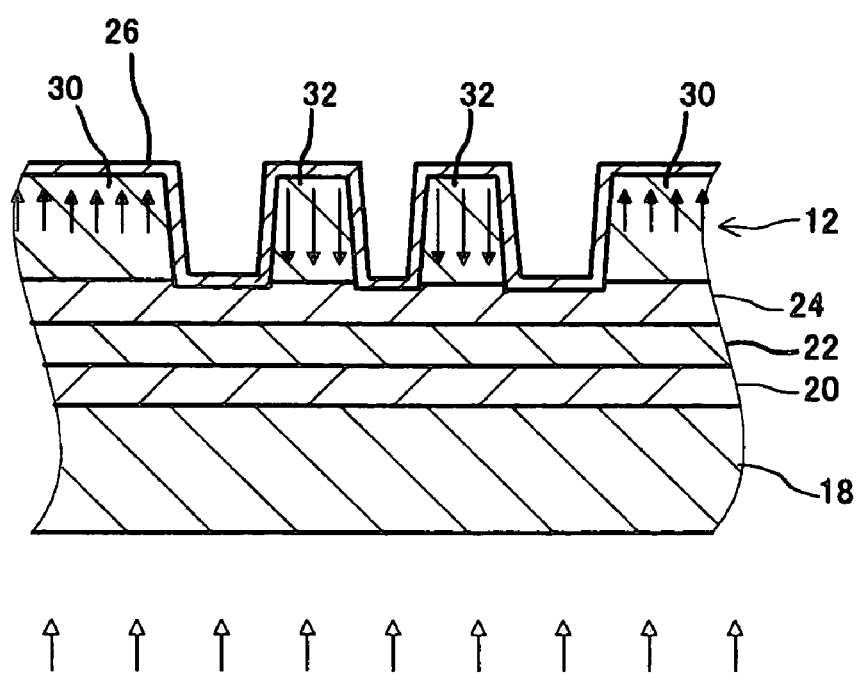
FIG. 11 is a sectional side view schematically showing the step of applying a second external magnetic field to the magnetic recording medium.

Next, a uniform direct-current external magnetic field lower than the coercivity of the servo pattern gap filling parts 30 and higher than the coercivity of the servo pattern unit parts 32 is applied in the direction opposite to that of the foregoing external field as shown in FIG. 11, whereby the servo pattern unit parts 30 are magnetized in the reverse polarity (S111). Here, the servo pattern gap filling parts 32 will not be reversed in the polarity of magnetization. That is, the servo pattern unit parts 30 and the servo pattern gap filling parts 32 are magnetized in opposite directions, completing the recording of the servo information.

As above, the servo information can be recorded easily by applying the uniform direct-current external magnetic fields in two steps. The method of manufacturing the magnetic recording medium according to the exemplary embodiment is thus high in production efficiency.

In addition, the step of separating the servo areas 28 of the magnetic layer 12 into the servo pattern unit parts 30 and the servo pattern gap filling parts 32 is performed simultaneously with the step of separating the data areas 14 of the magnetic layer 12 into a number of recording elements 16. Even in this respect, the method of manufacturing the magnetic recording medium according to the exemplary embodiment can thus be said to have a high production efficiency.

In addition, forming the servo pattern gap filling parts 32 as part of the magnetic layer 12 facilitates manufacturing as compared to the case where the servo pattern gap filling parts 32 are made of other materials. Even in this respect, the method of manufacturing the magnetic recording medium according to the exemplary embodiment is high in production efficiency.

While the exemplary embodiment uses a CoPt alloy as the material of the magnetic layer 12, the magnetic layer 12 may be made of other materials such as a Co (cobalt) alloy, a lamination of Co and Pd (palladium), a lamination of Co and Pt (platinum), Fe (iron), an Fe alloy, and a lamination of Fe alloys. Incidentally, the lamination of Co and Pd (palladium) has the property that the physical size and the coercivity have the relationship shown by the curve designated by the symbol B in FIG. 3.

In the exemplary embodiment, the magnetic recording medium 10 has the servo pattern gap filling parts 32 of generally circular shape, many of which are patterned to lie near the servo areas 28 as shown in FIG. 1 seen above. However, the shape, number of arrangement, and pattern of arrangement of the servo pattern gap filling parts may be selected as appropriate so that favorable airflow can be formed between the magnetic recording medium 10 and the head.

In the exemplary embodiment, the magnetic recording medium 10 has the servo pattern gap filling parts 32 which are formed smaller than the servo pattern unit parts 30. Nevertheless, the servo pattern gap filling parts may be formed greater than the servo pattern unit parts. For example, the servo pattern gap filling parts in the present embodiment may be integrated so that a single servo pattern gap filling part is arranged in each servo area.

Figure 12:
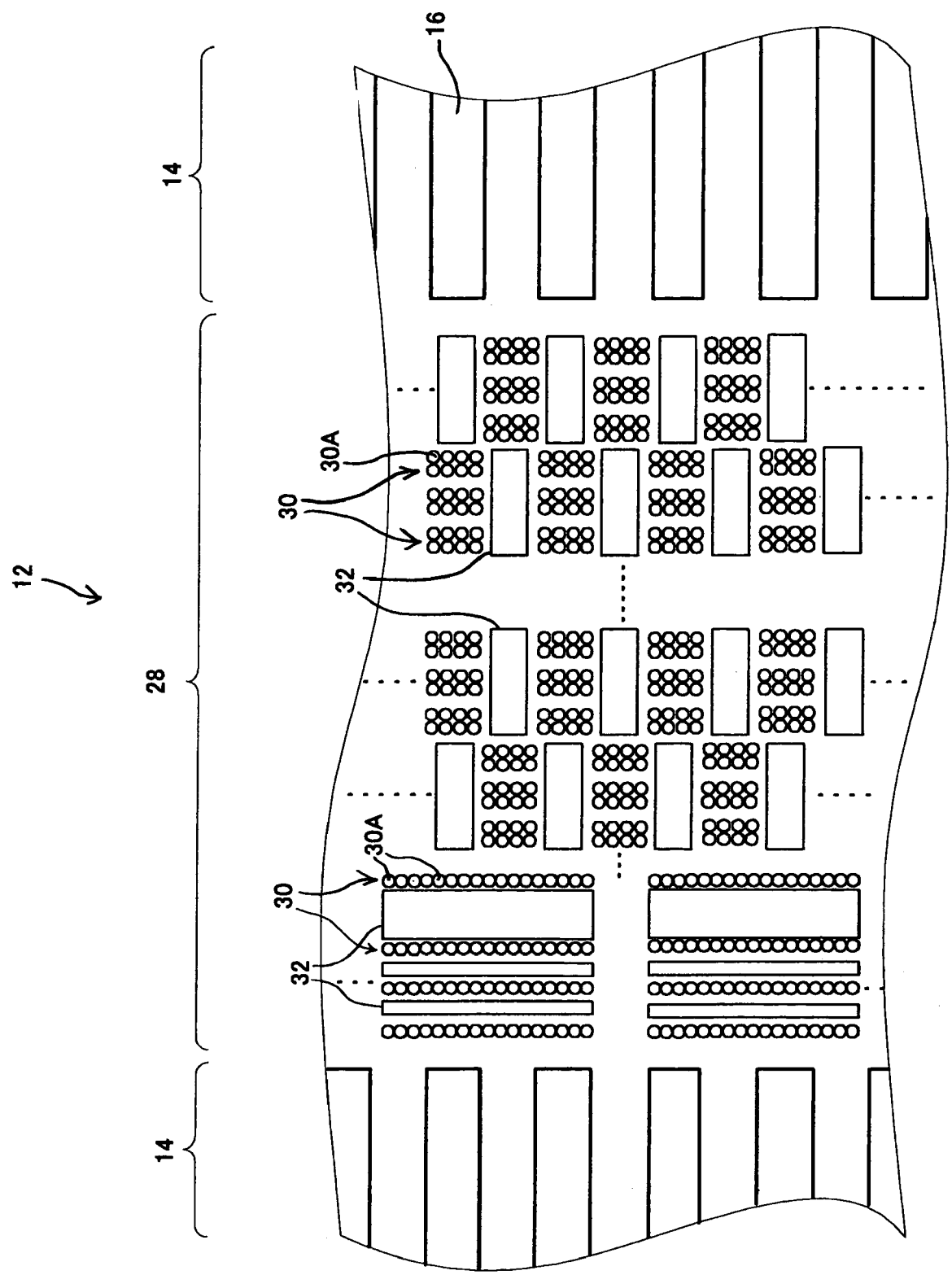
FIG. 12 is a plan view schematically showing another example of the structure of the magnetic recording medium according to the exemplary embodiment.

On the other hand, as shown in FIG. 12, for example, each servo pattern unit part may be formed as a set of a plurality of smaller servo pattern unit part components 30A while the servo pattern gap filling parts 32 are formed greater than the servo pattern unit part components 30A. This configuration can increase differences in magnetic property between the servo pattern unit parts and the servo pattern gap filling parts.

In the exemplary embodiment, the magnetic recording medium 10 has the servo pattern unit parts 30 and the servo pattern gap filling parts 32 that differ in coercivity and are magnetized in opposite polarities. However, the servo pattern unit parts and the servo pattern gap filling parts may be formed in different sizes so that they differ in other magnetic properties such as magnetic anisotropy and residual magnetization. In this case, the two parts are distinguished based on the differences in these magnetic properties.

In the exemplary embodiment, the magnetic recording medium 10 is a vertical recording magnetic disc of discrete type in which the data areas 14 have a number of recording elements 16 arranged in rows at fine track pitches in the radial directions. However, it is obvious that the present invention is applicable to magnetic discs that have recording elements arranged at fine spacings in the circumferential direction of the tracks (sector direction), and magnetic discs that have recording elements arranged at fine spacings both in the radial directions and circumferential direction of the tracks. The present invention is also applicable to manufacturing other magnetic recording media including magneto-optical discs such as an MO.

The present invention is also applicable to a magnetic recording medium that has a continuous magnetic layer in the data areas. Even in this case, the effect of a significant improvement in the read efficiency of the servo information is obtained to separate servo areas into servo pattern unit parts and servo pattern gap filling parts.

The exemplary embodiment has dealt with the case where the first mask layer 54 is made of TiN. Nevertheless, the first mask layer 54 is not limited to any particular material but has only to be less prone to removal by reactive ion etching that uses CO gas or the like as the reactive gas. For example, Ti (titanium), Ta (tantalum), Mg (magnesium), Al (aluminum), Si (silicon), Ge (germanium), Pb (lead), and alloys and compounds consisting mostly of the same may be used.

The exemplary embodiment has dealt with the case where the second mask layer 56, a negative type resist, is formed over the first mask layer 54 for the sake of dry etching the first mask layer 54 to a predetermined pattern, and the first mask layer 54 is processed into the predetermined pattern by two steps of dry etching. However, the other layers to be formed on the first mask layer 54 are not limited to any particular material, number of layers, etc., as long as the first mask layer 54 can be processed to a predetermined pattern. For example, the first mask layer 54 may be processed into a predetermined pattern by three or more steps of dry etching.

In the exemplary embodiment, the first mask layer 54 is processed by reactive ion etching using $CF_4$ or $SF_6$ as the reactive gas. However, the reactive gas is not limited to any particular type as long as it reacts with the material of the first mask layer 54 as described above for etching promotion. For example, other fluorine-based gases such as $NF_3$ (nitrogen trifluoride) and $CHF_3$ (fluoroform), and chlorine-based gases such as $Cl_2$ (chlorine), $BCl_3$ (boron trichloride), and $CHCl_3$ (chloroform) may be used.

EXAMPLE

A magnetic recording medium 10 was fabricated according to the foregoing exemplary embodiment. The servo pattern gap filling parts 32 were formed in a generally circular shape of approximately 100 nm in diameter.

Figure 13:
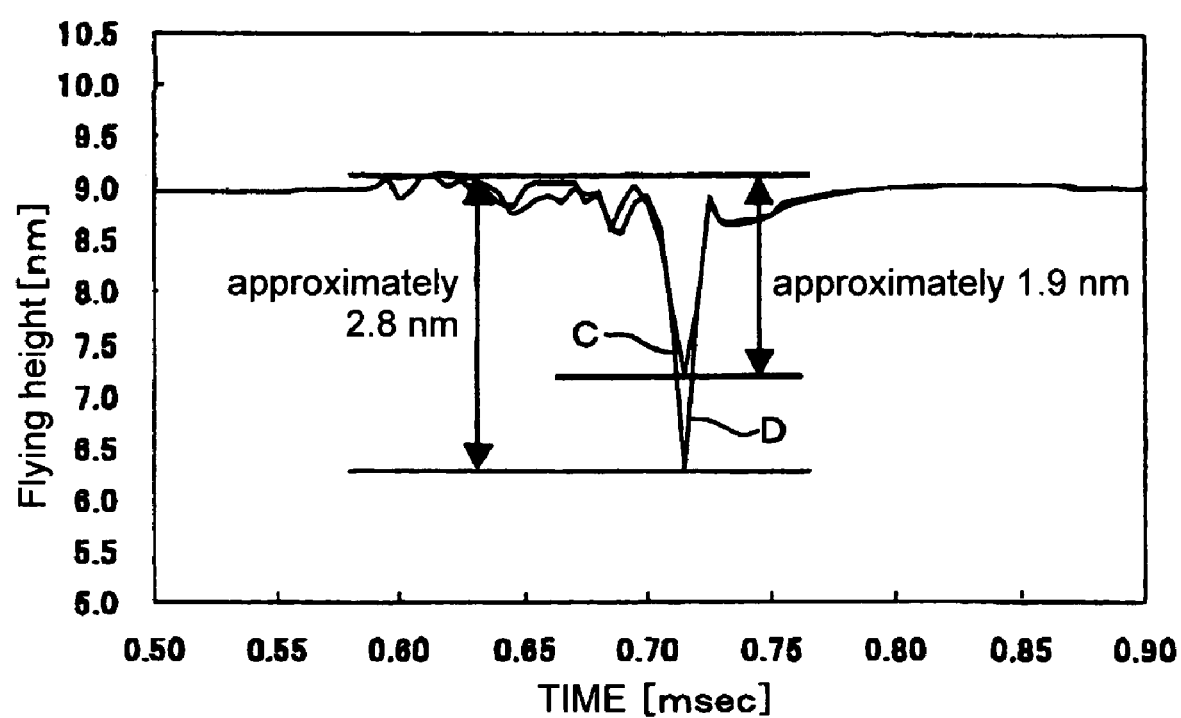
FIG. 13 is a graph showing the head flying heights of magnetic recording media according to an example of the exemplary embodiment and a comparative example.

The magnetic recording medium 10 was rotated with a head slider (not shown) in the vicinity, and the flying height of the head element was measured. The head element behaved as shown by the curve designated by the symbol C in FIG. 13. Incidentally, the portion where the curve varies greatly shows the variation in the flying height of the head element across the boundary between a data area and a servo area. The flying height of the head element was stable within the data area. The head element showed a variation of 0.5 nm after the head slider entered the servo area. A maximum variation of approximately 1.9 nm was observed at the instant when the head element of the head slider entered from the data area into the servo area.

Comparative Example

In contrast to the example described above, a comparative sample was fabricated in which the servo areas 28 were not provided with the servo pattern gap filling parts 32 but the servo pattern unit parts 30 alone.

This comparative sample was rotated with a head slider (not shown) in the vicinity, and the flying height of the head element was measured. The head element behaved as shown by the curve designated by the symbol D in FIG. 13.

The flying height of the head element was stable within the data area. The head element showed a variation of 0.5 nm after the head slider entered the servo area. A maximum variation of approximately 2.8 nm was observed at the instant when the head element of the head slider entered from the data area into the servo area.

In short, it was confirmed that the example, with reference to the comparative example, was largely reduced in the variable range of the flying height of the head element across the boundary between a data area and a servo area.

As has been described, according to the exemplary embodiments, there are produced the excellent effects that head behavior is stabilized and that servo information can be recorded efficiently.

What is claimed is:

1. A magnetic recording medium comprising a magnetic layer which is sectioned into a plurality of data areas and a plurality of servo areas for information recording, wherein
   in each of the servo areas, the magnetic layer is separated into a plurality of servo pattern unit parts for forming a predetermined servo pattern and a plurality of servo pattern gap filling parts patterned to fill gaps between the plurality of servo pattern unit parts partly;
   the servo pattern unit parts and the servo pattern gap filling parts consist of projections of the magnetic layer;
   the servo pattern unit parts and the servo pattern gap filling parts are magnetized in opposite polarities in a direction vertical to a surface.

2. The magnetic recording medium according to claim 1, wherein
   the servo pattern unit parts and the servo pattern gap filling parts are formed in different sizes so as to have different magnetic properties.

3. The magnetic recording medium according to claim 2, wherein
   the servo pattern unit parts and the servo pattern gap filling parts are formed in different sizes so as to have different coercivities as the magnetic properties.

4. The magnetic recording medium according to claim 3, wherein:
   in each of the data areas, the magnetic layer is separated into a number of recording elements; and
   the servo pattern gap filling parts are formed so that the ratio of the total area of the servo pattern unit parts and the servo pattern gap filling parts in each of the servo areas is closer to the ratio of the area of the recording elements in each of the data areas than the ratio of the area of the servo pattern unit parts in each of the servo areas.

5. The magnetic recording medium according to claim 2, wherein
   the servo pattern unit parts and the servo pattern gap filling parts are formed in different sizes so as to have different magnetic anisotropies as the magnetic properties.

6. The magnetic recording medium according to claim 5, wherein:
   in each of the data areas, the magnetic layer is separated into a number of recording elements; and
   the servo pattern gap filling parts are formed so that the ratio of the total area of the servo pattern unit parts and the servo pattern gap filling parts in each of the servo areas is closer to the ratio of the area of the recording elements in each of the data areas than the ratio of the area of the servo pattern unit parts in each of the servo areas.

7. The magnetic recording medium according to claim 2, wherein
   the servo pattern unit parts and the servo pattern gap filling parts are formed in different sizes so as to have different residual magnetizations as the magnetic properties.

8. The magnetic recording medium according to claim 7, wherein:
   in each of the data areas, the magnetic layer is separated into a number of recording elements; and
   the servo pattern gap filling parts are formed so that the ratio of the total area of the servo pattern unit parts and the servo pattern gap filling parts in each of the servo areas is closer to the ratio of the area of the recording elements in each of the data areas than the ratio of the area of the servo pattern unit parts in each of the servo areas.

9. The magnetic recording medium according to claim 2, wherein:
   in each of the data areas, the magnetic layer is separated into a number of recording elements; and
   the servo pattern gap filling parts are formed so that the ratio of the total area of the servo pattern unit parts and the servo pattern gap filling parts in each of the servo areas is closer to the ratio of the area of the recording elements in each of the data areas than the ratio of the area of the servo pattern unit parts in each of the servo areas.

10. The magnetic recording medium according to claim 2, wherein:
    in each of the data areas, the magnetic layer is separated into a number of recording elements at fine track pitches in a direction vertical to the traveling direction of a write/read head; and
    the servo pattern gap filling parts are patterned to lie at least in part near the data areas in the servo area.

11. The magnetic recording medium according to claim 1, wherein:
    in each of the data areas, the magnetic layer is separated into a number of recording elements at fine track pitches in a direction vertical to the traveling direction of a write/read head; and
    the servo pattern gap filling parts are patterned to lie at least in part near the data areas in the servo area.

12. The magnetic recording medium according to claim 1, wherein:
    in each of the data areas, the magnetic layer is separated into a number of recording elements; and
    the servo pattern gap filling parts are formed so that the ratio of the total area of the servo pattern unit parts and the servo pattern gap filling parts in each of the servo areas is closer to the ratio of the area of the recording elements in each of the data areas than the ratio of the area of the servo pattern unit parts in each of the servo areas.

13. The magnetic recording medium according to claim 1, wherein
    the servo pattern gap filling parts are formed smaller than the servo pattern unit parts.

14. A magnetic recording medium comprising a magnetic layer which is sectioned into a plurality of data areas and a plurality of servo areas for information recording, wherein
    in each of the servo areas of the magnetic layer, servo pattern unit parts for forming a predetermined servo pattern are separated in a direction vertical to the traveling direction of a write/read head; and the servo pattern unit parts are separated so as to have a length greater than or equal to a track width, but not exceeding 0.2 mm, in the direction vertical to the traveling direction of the write/read head.

15. A method of manufacturing a magnetic recording medium, comprising:

a magnetic layer forming step of forming a uniform magnetic layer on a substrate;

a magnetic layer processing step of separating the magnetic layer into a plurality of servo pattern unit parts consisting of projections for forming a predetermined servo pattern and a plurality of servo pattern gap filling parts consisting of projections for filling gaps between the plurality of servo pattern unit parts partly, and forming the servo pattern unit parts and the servo pattern gap filling parts in different sizes so as to have different magnetic coercivities;

a first direct-current magnetic field applying step of applying a uniform direct-current magnetic field higher than the coercivities of both the servo pattern unit parts and the servo pattern gap filling parts to the magnetic layer; and a second direct-current magnetic field applying step of applying a uniform direct-current magnetic field having an intensity intermediate between the coercivity of the servo pattern unit parts and the coercivity of the servo pattern gap filling parts to the magnetic layer in a direction opposite to that of the foregoing direct-current magnetic field.

* * * * *